US011532952B2

(12) United States Patent
Kovacs et al.

(10) Patent No.: US 11,532,952 B2
(45) Date of Patent: Dec. 20, 2022

(54) WIRELESS CHARGER AND WIRELESS CHARGING COMPATIBLE MAGNETIC MOUNTING FOR ELECTRONIC DEVICES

(71) Applicant: Kustom Cycles, Inc., Mitchell, SD (US)

(72) Inventors: Tamas Kovacs, Basalt, CO (US); Anthony Velasquez, Longmont, CO (US)

(73) Assignee: Kustom Cycles, Inc., Mitchell, SD (US)

( * ) Notice: Subject to any disclaimer, the term of this patent is extended or adjusted under 35 U.S.C. 154(b) by 92 days.

(21) Appl. No.: 17/173,043

(22) Filed: Feb. 10, 2021

(65) Prior Publication Data
US 2021/0273487 A1 Sep. 2, 2021

Related U.S. Application Data

(60) Provisional application No. 62/972,144, filed on Feb. 10, 2020.

(51) Int. Cl.
*H02J 50/12* (2016.01)
*H02J 7/00* (2006.01)
*H02J 50/90* (2016.01)
*H02J 50/00* (2016.01)
*H02J 50/80* (2016.01)

(52) U.S. Cl.
CPC ............ *H02J 50/12* (2016.02); *H02J 7/0042* (2013.01); *H02J 50/005* (2020.01); *H02J 50/80* (2016.02); *H02J 50/90* (2016.02)

(58) Field of Classification Search
CPC .. H02J 50/12; H02J 50/80; H02J 50/90; H02J 50/005; H02J 7/0042
USPC .......................................................... 307/104
See application file for complete search history.

(56) References Cited

U.S. PATENT DOCUMENTS

| 10,732,732 | B2 * | 8/2020 | Chan ...................... H02J 7/0044 |
| 11,043,844 | B2 * | 6/2021 | Langlois .................. H02J 7/025 |
| 2014/0117926 | A1 * | 5/2014 | Hwu ........................ H02J 50/10 320/108 |
| 2015/0091500 | A1 * | 4/2015 | Claudepierre .......... H02J 50/10 320/108 |
| 2015/0188356 | A1 * | 7/2015 | Chen ....................... H02J 50/10 320/108 |
| 2020/0059114 | A1 * | 2/2020 | Langlois ................. H02J 50/90 |

* cited by examiner

*Primary Examiner* — Alfonso Perez Borroto
(74) *Attorney, Agent, or Firm* — Holzer Patel Drennan

(57) ABSTRACT

Designs for a magnetic mounting system that facilitate wireless charging. The magnetic mounting system generally includes an attachment member engaged with a device that interfaces magnetically with a carrier member. The attachment member may comprise a split ring or discontinuous ring comprising arcuate members that allows inductive coupling between a charge transmitting coil and a charge receiving coil to be achieved as the arcuate members do not interfere with the inductive coupling. Specifically, rather than a solid plate in which the RF energy emitted by the charge transmitting coil generates eddy currents in the plate, the arcuate members are substantially transparent to the RF energy such that inductive coupling may be achieved.

20 Claims, 7 Drawing Sheets

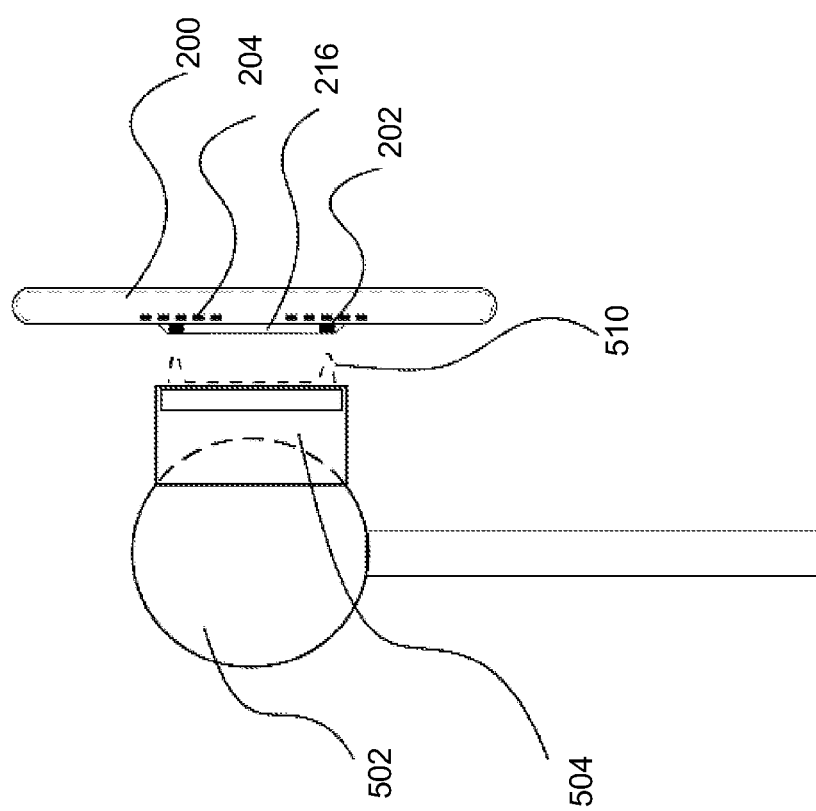

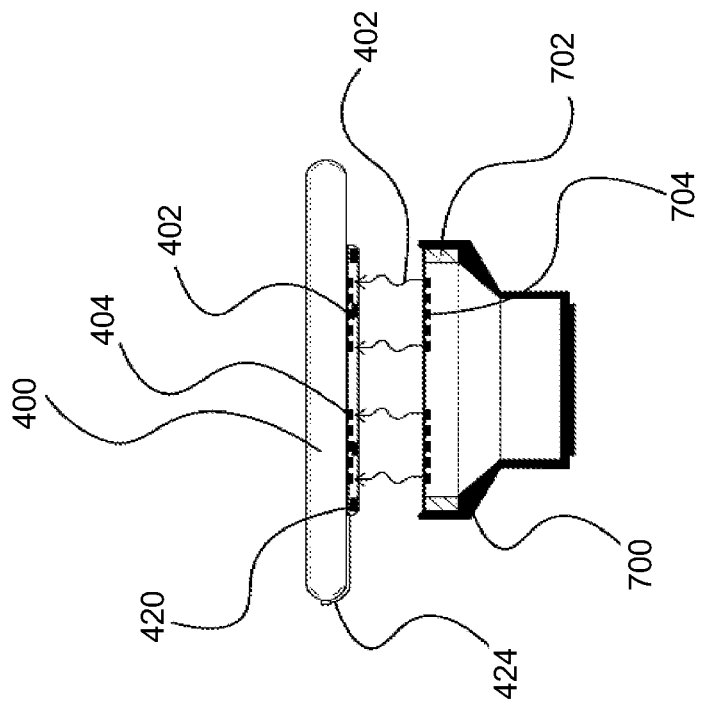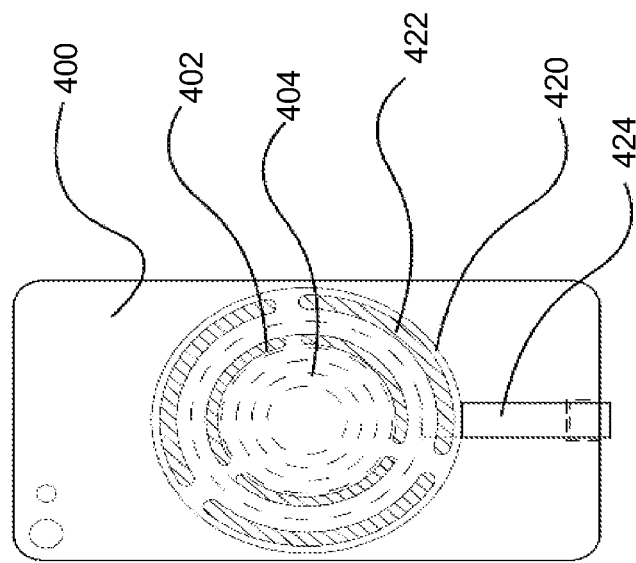
Fig. 8

WIRELESS CHARGER AND WIRELESS CHARGING COMPATIBLE MAGNETIC MOUNTING FOR ELECTRONIC DEVICES

CROSS-REFERENCE TO RELATED APPLICATIONS

This application claims priority to U.S. Provisional App. No. 62/972,144 filed on 10 Feb. 2020 entitled "WIRELESS CHARGER & WIRELESS CHARGING COMPATIBLE MAGNETIC MOUNTING FOR ELECTRONIC DEVICES," the entirety of which is incorporated herein by reference.

BACKGROUND

Universal magnetic mounting solutions for mobile and other electronic devices have been proposed. Generally, these systems consists of a ferro-magnetic disk (e.g., an attachment member) permanently or semi-permanently attached to the device allowing it to be removably attachable to a magnetic carrier member that magnetically attaches to a base member allowing free rotation and/or articulation of the device. One such example is U.S. Pat. No. 8,900,009, which is incorporated by reference in its entirety herein.

As wireless charging is gaining prominence it is becoming increasingly important to provide mounting solutions that do not interfere with wireless charging and ones that provide mounting and wireless charging for the device at the same time.

SUMMARY

In view of the foregoing, the present disclosure generally relates to a mounting system that includes magnetic support for a device while allowing the device to be used with wireless chargers. In one example, the wireless charger used with a device may be a magnetically attachable wireless charger that may be utilized in the presence of an attachment member that facilitates wireless charging. Specifically, an attachment member for supportably engaging a device having wireless charging capability with a magnetic mounting system is provided that includes a plurality of arcuate members that are magnetically interactive with a magnetic support of the magnetic mounting system. The arcuate members are disposed in a circular formation to define a space between respective end portions of adjacently disposed arcuate members. The plurality of arcuate members are configured for engagement with an exterior surface of the device between a charge receiving coil of the device and a charge transmitting coil of an inductive wireless charger to allow for inductive coupling of the charge receiving coil and the charge transmitting coil.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 5 illustrates a side view of an example of a device disposed in relation to a carrier member of a mount and having an attachment member affixed to a device that allows for use with the wireless charger.

FIG. 8 illustrates an elevation view of an example of an attachment member including a receiving coil that may be affixed to a device that allows for use with a wireless charger.

DETAILED DESCRIPTION

Figure 2:
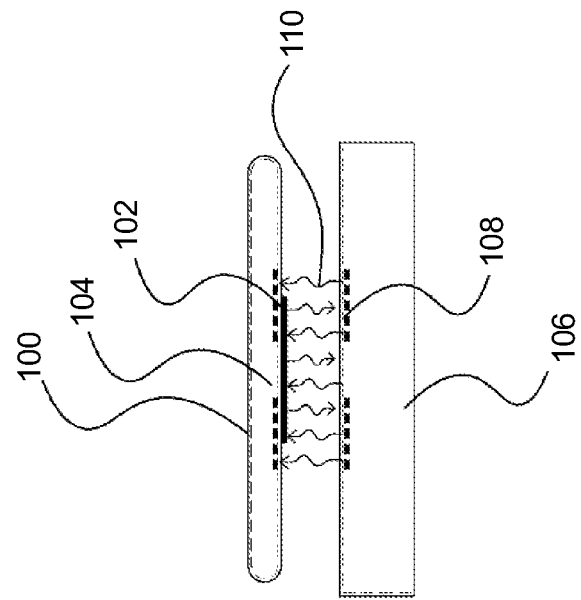
FIGS. 1 and 2 illustrate a mounting system having a solid attachment member that interferes with inductive coupling between a device and a wireless charger.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Figure 1:
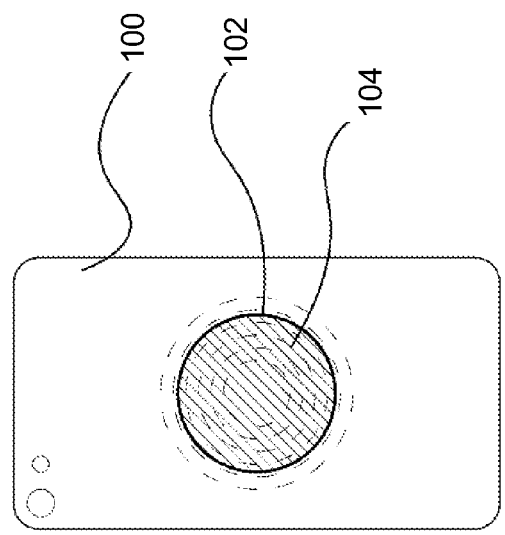

With reference to FIG. 1, a solid ferro-magnetic attachment member 102, which may be generally applied to the back center of a device 100 may interfere with wireless charging as it is placed between the charging coil of the wireless charger and a receiving coil 104 of the device which is generally placed in the center of the device 100. With further reference to FIG. 2, an electromagnetic field 110 generated by a charging coil 108 of a wireless charger 106 (e.g., the charge transmitting coil), may induce current eddies or other current fields in the solid attachment member 102, thus reducing or preventing inductive coupling between the charge transmitting coil 106 and the charge receiving coil 104 of the device 100. Typically, the induction of eddy currents in the solid ferro-magnetic attachment member 102 results in the solid attachment members being heated. Many wireless charging protocols will in turn sense the heating of the device 100 (e.g., by direct temperature measurement or by a differential in electrical current between a charging coil 108 and a receiving coil 104 of the wireless charger 106 and the device 100 being charged, respectively.

Figure 3:
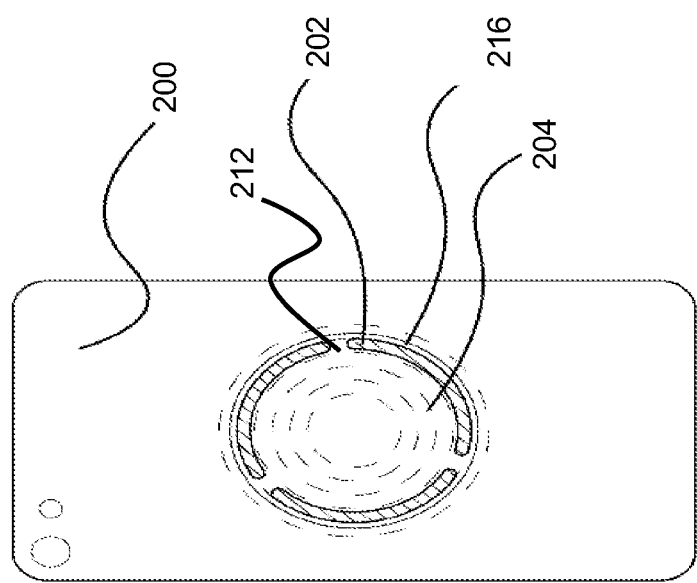
FIG. 3 illustrates an elevation view of an example of an attachment member affixed to a device that allows for use with a wireless charger.

With reference to FIG. 3, an attachment member 202 having a "split ring" or other non-continuous shape design may be used that may replace the solid disk attachment member 102 or continuous ring of the attachment member described in the '009 Patent incorporated by reference above. The non-continuous attachment member 202 may correspond with the shaped magnetic field 510 of a carrier member 504 (as shown in FIG. 5) by optimizing ferromagnetic material where the magnetic field 510 is amplified and omitting ferro-magnetic material where magnetic field 510 is not substantial. As can be appreciated, the "split ring" shape of the attachment member 202 includes a plurality of arcuate members 216 that are disposed in a circular configuration with space 212 created between adjacent end portions of each arcuate member 216.

As shown in FIGS. 3 and 5, the arcuate members 216 of the attachment member 202 may be circumferentially separated arcuate members 216 that may be disposed in corresponding relation to an area of increased magnetic field strength 510 of a carrier member 504. The shaping of the magnetic field 510 of the carrier member 504 may be accomplished by any technique for appropriately shaping the field 510. For instance, by placing a disk magnet in a ferromagnetic cup or by using other technologies, the magnetic field may be shaped to direct the majority of the magnetic pull to a narrow ring near the outer circumference of the diameter of the carrier member 504 that corresponds (i.e., achieves maximum field strength near) an area between the inner diameter and outer diameter of the ferromagnetic split ring of the attachment member 202. Preferably, nearly all of the magnetic field 510 is isolated to an area between an inner diameter and an outer diameter of the split ring arcuate members 216.

As shown in FIGS. 3 and 5, the arcuate members 216 may be specifically dimensioned to allow for sufficient magnetic interaction with the shaped magnetic field 510 of the carrier member 504, while also sufficiently reducing or eliminating the generation of eddy currents when exposed between coils used for inductive coupling in wireless charging. For instance, the arcuate members 216 may have a cross dimension of not less than 0.050 inches, not less than 0.060 inches, not less than 0.070 inches, or not less than 0.080 inches. Additionally, the arcuate members 216 may have a cross dimension of not more than about 0.090 inches, not more than 0.080 inches, not more than 0.078 inches, or not more than 0.070 inches, provided the maximum dimension is greater than the minimum dimension. In a preferred embodiment, the cross dimension of the arcuate member 216 may be not less than about 0.060 inches and not greater than 0.090 inches, and more preferably not less than about 0.070 inches and not greater than about 0.078 inches. The cross dimension may correspond to a width dimension of the arcuate members 216 (e.g., measured in a radial direction of the arcuate member 216). The arcuate members 216 may have a thickness of not less than 0.050 inches, not less than 0.060 inches, not less than 0.070 inches, or not less than 0.080 inches. Additionally, the arcuate members 216 may have a thickness of not more than about 0.090 inches, not more than 0.080 inches, not more than 0.078 inches, or not more than 0.070 inches, provided the maximum thickness is greater than the minimum thickness. In a preferred embodiment, the thickness of the arcuate member 216 may be not less than about 0.060 inches and not greater than 0.090 inches, and more preferably not less than about 0.070 inches and not greater than about 0.078 inches.

Moreover, a spacing 212 between arcuate members 216 (e.g., along a circumferential arc about which the arcuate members 216 are disposed) may be not less than 0.090 inches, not less than about 0.100 inches, not less than 0.115 inches, or not less than 0.120 inches. Additionally, a spacing 212 between arcuate members 216 may be not greater than about 0.130 inches, not greater than about 0.120 inches, not greater than 0.115 inches, or not greater than 0.110 inches, provided the maximum spacing is greater than the minimum spacing. In a preferred embodiment, the spacing 212 between arcuate members 216 may be not less than 0.115 inches and not greater than 0.120 inches. Further still, the arcuate members 216 may collectively be provided in a circumferential pattern having a diameter measure corresponding to the circumference along which the arcuate members 216 are positioned (e.g., to a centerline, inner diameter, or outer diameter of the arcuate members). The diameter measure of the arcuate members 216 may be equal to the diameter measure of a member to which the attachment member 202 is engageable (e.g., a carrier member 504 or wireless charging device as described below). Alternatively, the diameter measure of the arcuate members 216 may be at least 90% of the diameter of the member to which the attachment member is engageable, at least 80% of the diameter of the member to which the attachment member is engageable, or at least 70% of the diameter of the member to which the attachment member is engageable.

Figure 4:
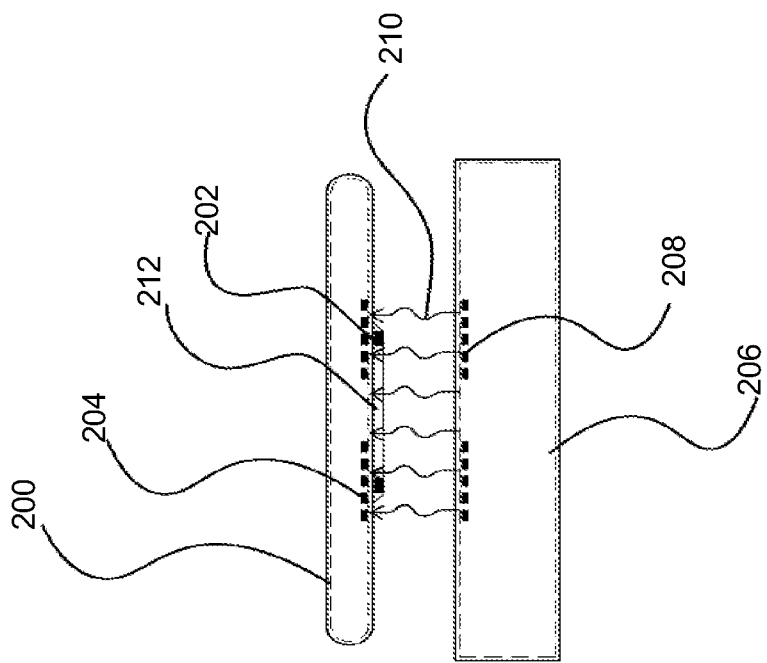
FIG. 4 illustrates a side view of an example of a device disposed in relation to a wireless charger and having an attachment member affixed to a device that allows for use with the wireless charger.

By not using a solid disk attachment member 102 or continuous ring in the attachment member 202, that is placed between the charging coil 208 of the wireless charging device 206 and receiving coil 204 of the electronic device 200, the electromagnetic (charging) field 210 remains uninterrupted as shown in FIG. 4. That is, inductive coupling between the charge transmitting coil 208 and the charge receiving coil 204 may be achieved as the arcuate members 216 do not interfere with the inductive coupling. Any appropriate split or non-continuous shape may be provided such that there is little or no inductive coupling between the attachment member 202 and the charge transmission coil 208. For instance, the split or spaced apart arcuate members 216 may not inductively couple with the charge transmission coil 208 as little or no current may be induced in the arcuate members 216 of the attachment member 202. In this regard, the power transmission by inductive coupling between the charge transmission coil 208 and the charge receiving coil 204 may be maintained. For example, it has been found that even a continuous ring of ferro-magnetic material with the width and thickness dimensions as described above would impede inductive coupling using most wireless charging protocols. Thus, the split ring design of the attachment member 2020 provides for reducing or eliminating the production of eddy currents in the attachment member 202 when disposed between a charging coil 208 and a receiving coil 204.

The attachment member 202 comprising the non-continuous shape or "split ring" configuration may be attached to an exterior of a device 200 (e.g., by way of adhesive). Alternatively, the attachment member 202 may be integrated into a housing or shell of a device 200. Further still, the attachment member 202 may be integrated into a case in which the device 200 is disposed. Further still, the arcuate members 216 may be provided in an over molded portion (e.g., comprising a polymeric material) that maintains the arcuate members 216 in a predetermined spacing and arrangement (e.g., for adhesively coupling the arcuate members 216 to a device 200). Further still, the arcuate members 216 may be provided on a film or other material that allows a user to maintain the spacing and arrangement of the arcuate members 216 when applying the arcuate members 216 to a device 200 (e.g., adhesively) even if the film or other material is later removed once the arcuate members 216 are affixed to the device 200.

Figure 7:
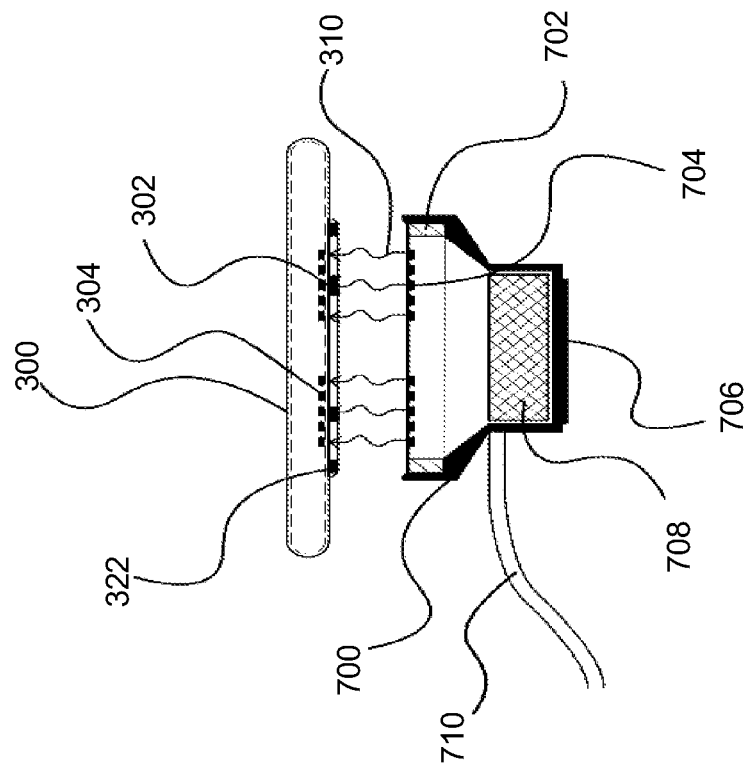
FIG. 7 illustrates a side view of an example of a device disposed in relation to a wireless charger comprising a carrier member, the device having an attachment member affixed to a device that allows for use with the wireless charger.

A user may have a desk stand, car mount and other mounting solutions throughout the user's home, office, vehicles, etc. and a user may want to be able to charge a device 200 on a wireless charging pad or attachable wireless charger (e.g., such as the inducive charging device shown in FIG. 7). With the "split-ring" attachment member 202 a user is able to use her device on carrier member 504 magnetic mounts on a desk stand while at the office, in a car using a carrier member 504 on the drive home and sill allow placing the device 200 on the wireless charging pad and charge it as the "split ring" design of the attachment member 202 does not interfere with wireless charging while still allowing magnetic attachment of the device on magnetic mounts as shown in FIG. 5.

With the increasing use of wireless charging in electronic devices there are more and more types of wireless chargers on the market. Most of them lay on a horizontal surface and the device rests on them which does not allow for efficient and ergonomic use of the device. However, other chargers may be engaged with the phone (e.g., using magnetic interaction). Such magnetic engagement of a charger to a device may allow alignment of wireless charging coils for more efficient transfer of power. An embodiment of the present disclosure provides an attachment member that may remain in place on a device to allow for engagement with a carrier member for support of a device and also provides for magnetic interaction with a wireless charger to secure a wireless charger to a device while the attachment member remains in place. As such, a user may alternatively use a magnetic mount without wireless charging and a magnetically attachable wireless charger without movement, removal, or other modification of the attachment member on the device.

Figure 9:
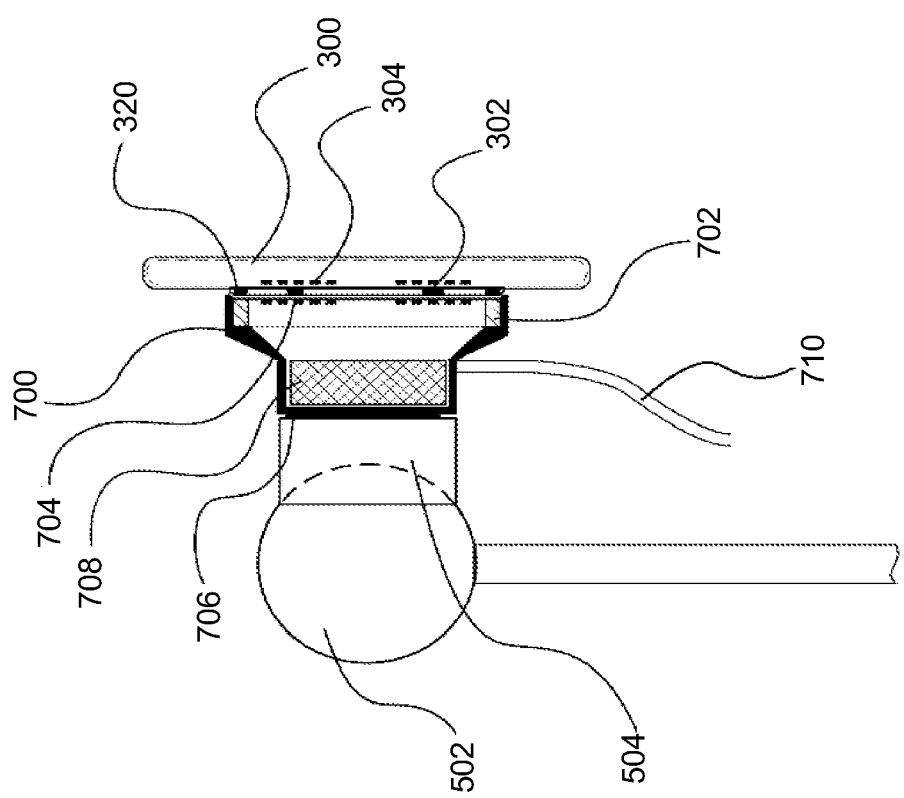
FIG. 9 illustrates a side view of an example of a device having an attachment member affixed to a device that allows for use with a wireless charger, wherein the device is magnetically attached to a wireless charging device that is in turn supported by a magnetic mounting system.

For example, an inductive charging device 700 as shown in FIG. 7 may comprise a wireless charger that may have on one side has a ferro-magnetic attachment member 706 to allow it to be removably attachable to a magnetic carrier member 504. The inductive charging device 700 may also include (outside of an outer diameter of charging coils 704 of the device 700) a magnetic interface 702 that allows the attachment of an electronic device 300 with a corresponding attachment member 320. This may allow the users to attach and charge their mobile devices 300 on wide variety of mounting solutions as shown in FIG. 9.

Figure 10:
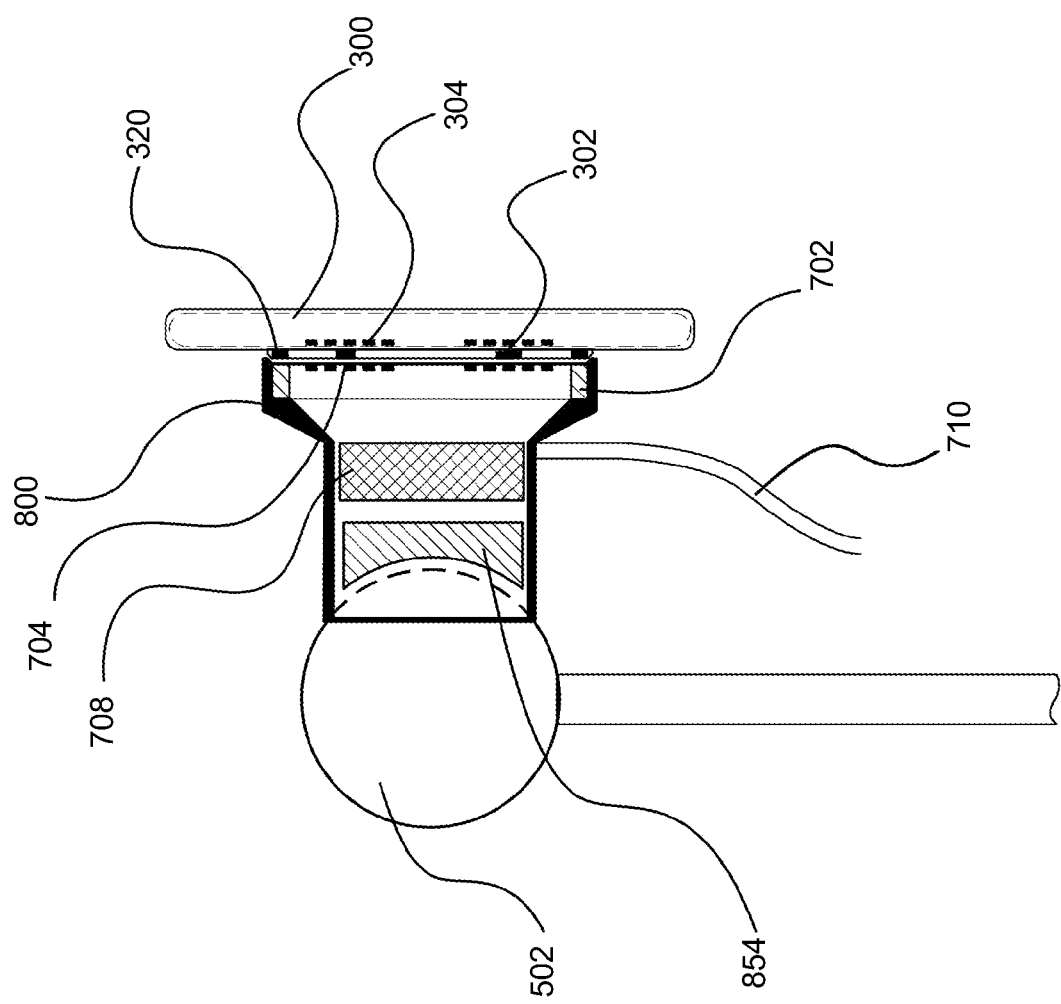
FIG. 10 illustrates a side view of an example of a device having an attachment member affixed to a device that allows for use with a wireless charger, wherein the device is magnetically attached to a wireless charging device integrated with a magnetic mounting system.

The inductive charging device 700 may also house a rechargeable battery 708 such as a power supply which powers the wireless charger 700 when unplugged. Alternatively, a cabled interface (e.g., a power cord 710) may be provided as a power supply. The inductive charging device 700 may be provided with an attachment member 706 that is removably attachable to a carrier member 504 as shown in FIG. 9. Alternatively, the inductive charging device 700 may comprise a carrier member 854 to allow for direct engagement with a base 502 (e.g. a bulbous member) as shown in FIG. 10.

Figure 6:
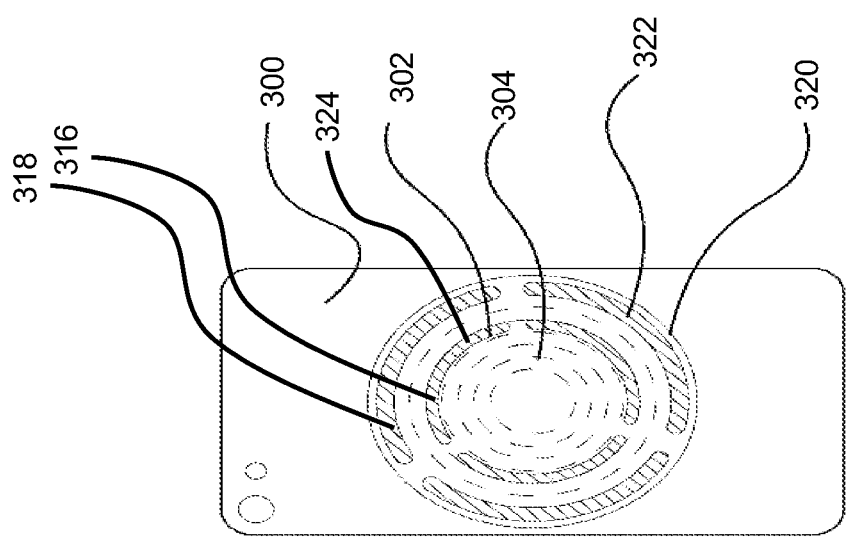
FIG. 6 illustrates an elevation view of an example of an attachment member affixed to a device that allows for use with a wireless charger that is configured for magnetic attachment to a wireless charger and a carrier member of a magnetic mount interchangeably.

Also an embodiment of an attachment member 302 may be provided for alternatively attaching a device 300 to a carrier member 504 for mountingly engaging the device 300 or a charging member 700 for supportably engaging the device 300 while allowing the device 300 to charge as shown in FIG. 6. In this regard, an attachment member 302 having a plurality of first arcuate members 316 and a plurality of second arcuate members 318 may be provided that are concentrically disposed to provide an inner ring 324 of arcuate members 316 and an outer ring 322 of arcuate members 318 as shown in FIG. 6. The inner ring 324 renders a device 300 removably attachable to a carrier member 504 while the outer ring 322 renders the device 300 removably attachable to the inductive charging device 700. The outer ring 322 may also comprise a solid member comprising a magnet or magnetically interactive material to secure the inducive charger 700 to the device 300. The diameter of the outer ring 322 may be between 1 inch and 3 inches in diameter. The diameter of the outer ring 322 may be between 1.7 inches and 2.5 inches in diameter. In another embodiment, the diameter of the outer ring 322 may be between 1.9 inches and 2.1 inches.

In any regard, the attachment member 302 comprising the inner ring 324 and the outer ring 322 facilitates selective engagement to either the inductive charge device 700 or a carrier member 504 such that both support methods are available and wireless charging capabilities are maintained without having to remove or otherwise modify the attachment member 302. The magnetic field of the inductive charging device 700 is shaped and corresponds with the outer ring 322 of the attachment member 302 as shown in FIG. 7, while the inner ring 324 corresponds with the shaped magnetic field of the carrier member 504 as is shown in FIG. 5. The inner 324 and outer ring 322 shapes may be provided with any of the dimensions and inter-member spacing described above.

The plurality of first arcuate members 316 and the plurality of second arcuate members 318 may be attached to an exterior of a device 300 (e.g., by way of adhesive). Alternatively, some or all of the attachment member 302 of this embodiment may be integrated into a housing or shell of a device 300. For example, the outer ring 322 may be integrated into a device 300 and the inner ring 324 may be adhesively attached in relation to the outer ring 322. Further still, the attachment member 302 of this embodiment may be integrated into a case in which the device 300 is disposed While wireless charging is becoming more prominent and many vehicles, coffee shops and other places offer wireless charging, not all mobile devices have wireless charging capabilities. In turn, a ferro-magnetic attachment member 402 may be provided that houses a wireless receiving coil 404 and electronics to convert a non-wireless charging compatible device 400 into wireless charging compatible. This embodiment of an attachment member 402 attaches to the device 400 or device case and is connected to the device's charging port through a power cable 424 and allows the device to be charged by wireless charging as shown in FIG. 8.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. An attachment member for supportably engaging a device having wireless charging capability with a magnetic mounting system, comprising:
   a plurality of arcuate members that are magnetically interactive with a magnetic support of the magnetic mounting system, wherein the arcuate members are disposed in a circular formation to define a space between respective end portions of adjacently disposed arcuate members; and wherein the plurality of arcuate members are configured for engagement with an exterior surface of the device between a charge receiving coil of the device and a charge transmitting coil of an inductive wireless charger to allow for inductive coupling of the charge receiving coil and the charge transmitting coil.

2. The attachment member of claim 1, wherein the plurality of arcuate members are disposed in a housing member.

3. The attachment member of claim 2, wherein the housing member maintains the plurality of arcuate members in the circular formation.

4. The attachment member of claim 3, wherein the housing member comprises an over molded portion that substantially encapsulates the arcuate members.

5. The attachment member of claim 1, wherein the plurality of arcuate members are adhesively attachable to the device.

6. The attachment member of claim 1, wherein the arcuate members collectively define a first interconnect portion that is magnetically engageable with a second interconnect portion of a carrier member comprising the magnetic support for supportive magnetic interaction between the arcuate members and the carrier member to support the device.

7. The attachment member of claim 6, further comprising at least three arcuate members.

8. The attachment member of claim 7, wherein the plurality of arcuate members are configured in corresponding relative relation to a magnet of a carrier member comprising a shaped magnetic field such that the arcuate members are magnetically interactive with the shaped magnetic field.

9. The attachment member of claim 8, wherein the arcuate members are disposed in areas of maximum magnetic field strength of the shaped magnetic field and the space between the arcuate members are disposed in areas of minimum magnetic field strength of the shaped magnetic field.

10. The attachment member of claim 1, wherein the plurality of arcuate members comprise ferro-magnetic material.

11. An inductive charging device for use in wireless charging of a device, comprising:
a housing defining a first interconnect portion on a first side of the housing and a second interconnect portion on a second side of the housing opposite the first side;
a charge transmission coil disposed adjacent the first side of the housing for creating an electromagnetic field extending away from the first side of the housing;
a magnet having a shaped magnetic field extending away from the first side of the housing;
a power supply in operative communication with the charge transmission coil to induce the electromagnetic field extending away from the first side of the housing; and
a magnetically interactive portion at the second interconnect portion for supportive engagement of the housing by way of magnetic interaction at the magnetically interactive portion.

12. The inductive charging device of claim 11, wherein the magnet comprises a ring magnet or circular pattern magnet assembly disposed in nonoverlapping concentric relation to the charge transmission coil at the first side.

13. The inductive charging device of claim 11, wherein the power supply comprises a battery.

14. The inductive charging device of claim 11, wherein the power supply comprises a wired interface.

15. The inductive charging device of claim 11, wherein the magnetically interactive portion at the second interconnect portion comprises an attachment member that is magnetically engageable with a carrier member.

16. An attachment member for supportably engaging a device having wireless charging capability with a magnetic mounting system, comprising:
a plurality of first arcuate members that are magnetically interactive, wherein the first arcuate members are disposed in a first circular formation to define a space between respective end portions of adjacently disposed first arcuate members;
a plurality of second arcuate members that are magnetically interactive, wherein the second arcuate members are disposed in a second circular formation that is concentric to the first circular formation to define a space between respective end portions of adjacently disposed second arcuate members; and
wherein the plurality of first arcuate members and second arcuate members are configured for engagement with an exterior surface of the device between a charge receiving coil of the device and a charge transmitting coil of an inductive wireless charger to allow for inductive coupling of the charge receiving coil and the charge transmitting coil.

17. The attachment member of claim 16, further comprising:
a charge receiving coil for inductive coupling with the charge transmitting coil; and
an electrical connection for establishing electrical communication between the charge receiving coil and a charging port of a device.

18. A system for magnetic mounting of a device with wireless charging, comprising:
an attachment member attachably engageable with a device comprising:
a plurality of first arcuate members that are magnetically interactive, wherein the first arcuate members are disposed in a first circular formation to define a space between respective end portions of adjacently disposed first arcuate members, and
a plurality of second arcuate members that are magnetically interactive, wherein the second arcuate members are disposed in a second circular formation that is concentric to the first circular formation to define a space between respective end portions of adjacently disposed second arcuate members;
an inductive charging device comprising:
a housing defining a first interconnect portion on a first side of the housing and a second interconnect portion on a second side of the housing opposite the first side,
a charge transmission coil disposed adjacent the first side of the housing for creating an electromagnetic field extending away from the first side of the housing,
a magnet having a shaped magnetic field extending away from the first side of the housing,
a power supply in operative communication with the charge transmission coil to induce the electromagnetic field extending away from the first side of the housing, and
a magnetically interactive portion at the second interconnect portion for supportive engagement of the housing by way of magnetic interaction at the magnetically interactive portion;
a carrier member comprising a third interconnect portion;

wherein the attachment member is magnetically engageable with the first interconnect portion by magnetic interaction between the plurality of first arcuate members and the magnet of the inductive charging device to support the device and establish inductive coupling between the charge transmission coil and a charge receiving coil of the device such that the plurality of second arcuate members are disposed between the charge transmission coil and the charge receiving coil when the first arcuate members are engaged with the magnet without electromagnetic interference between the charge transmission coil and the charge receiving coil;

the system being configurable between a charging configuration and a support configuration:

the charging configuration comprising the magnetically interactive portion at the second interconnect position being magnetically interactive with the third interconnect portion of the carrier member to supportably engage the inductive charging device, which in turn is supportably engageable with the attachment member to support the device, and the support configuration comprising the plurality of second arcuate members being magnetically interactive with the third interconnect portion of the carrier member to supportably engage the device without the presence of the inductive charging device.

19. The system of claim 18, further comprising:

a bulbous member comprising a convexly curved surface area, wherein at least a portion of the convexly curved surface area is unobstructed; and wherein the carrier member comprises a fourth interconnect portion on an opposite side of the carrier member as the third interconnect portion, wherein the fourth interconnect portion comprises a concave surface area for conformal adjacent engagement with the convexly curved surface area, and wherein at least a portion of the concave surface area is supportively contactable with the convexly curved surface area, and wherein the concave surface area is selectively positionable with respect to the convexly shaped surface area throughout a continuum of positions across the unobstructed portion of the convexly shaped surface area.

20. The system of claim 18, further comprising:

a bulbous member comprising a convexly curved surface area, wherein at least a portion of the convexly curved surface area is unobstructed; and wherein the magnetically interactive portion at the second interconnect portion of the inductive charging device comprises a concave surface area for conformal adjacent engagement with the convexly curved surface area, and wherein at least a portion of the concave surface area is supportively contactable with the convexly curved surface area, and wherein the concave surface area is selectively positionable with respect to the convexly shaped surface area throughout a continuum of positions across the unobstructed portion of the convexly shaped surface area.

* * * * *